US011891766B2

(12) United States Patent
Virnig et al.

(10) Patent No.: US 11,891,766 B2
(45) Date of Patent: Feb. 6, 2024

(54) PICK-UP BROOM ATTACHMENT WITH INTERNAL WATER TANK

(71) Applicant: Virnig Manufacturing, Inc., Rice, MN (US)

(72) Inventors: Darin R. Virnig, Sartell, MN (US); Blake A. Tchida, Sartell, MN (US)

(73) Assignee: Virnig Manufacturing, Inc., Rice, MN (US)

( * ) Notice: Subject to any disclaimer, the term of this patent is extended or adjusted under 35 U.S.C. 154(b) by 169 days.

(21) Appl. No.: 17/405,871

(22) Filed: Aug. 18, 2021

(65) Prior Publication Data

US 2022/0243410 A1 Aug. 4, 2022

Related U.S. Application Data

(60) Provisional application No. 63/144,587, filed on Feb. 2, 2021.

(51) Int. Cl.
*E01H 1/10* (2006.01)
*B08B 7/04* (2006.01)
(Continued)

(52) U.S. Cl.
CPC ............... *E01H 1/101* (2013.01); *B05B 1/20* (2013.01); *B08B 1/002* (2013.01); *B08B 1/04* (2013.01);
(Continued)

(58) Field of Classification Search
CPC ............. A47L 11/24; A47L 11/28–283; A47L 11/29–293; A47L 11/4013;
(Continued)

(56) References Cited

U.S. PATENT DOCUMENTS

| | | | | |
|---|---|---|---|---|
| 639,020 A * | 12/1899 | Cadmus | A47L 11/4041 | 15/79.1 |
| 1,399,634 A * | 12/1921 | Lund | E01H 1/045 | 56/193 |

(Continued)

FOREIGN PATENT DOCUMENTS

| | | |
|---|---|---|
| CN | 201469197 U | 5/2010 |
| CN | 201855229 U | 6/2011 |

(Continued)

OTHER PUBLICATIONS

Machine Translation of Kim (KR 100911192) “Kim Translation” (Year: 2009).*

(Continued)

*Primary Examiner* — Don M Anderson
*Assistant Examiner* — Jonathan R Zaworski
(74) *Attorney, Agent, or Firm* — Patterson Thuente, P.A.

(57) ABSTRACT

A pick-up broom attachment for use with a work vehicle that includes a hood assembly, a bucket portion, and a water spray bar. The hood assembly includes a housing, a rotatable brush of generally cylindrical profile mounted for rotation, and a drive motor coupled to the housing for rotating the rotatable brush. The bucket portion is in coupled engagement behind and with the hood assembly and includes: a collection bin defined by a bottom bucket panel, a pair of side bucket panel members, and a rear bucket wall; an internal water tank located in a cavity in the bucket portion located rearward of the rear bucket wall; and a back panel located rearward of the internal water tank that includes implement interface members for connecting with a work vehicle. The water spray bar is mounted to the housing of the hood for delivering water in front of the hood assembly.

20 Claims, 6 Drawing Sheets

(51) Int. Cl.

| | |
|---|---|
| ***B08B 1/00*** | (2006.01) |
| ***B08B 1/04*** | (2006.01) |
| ***E01H 1/04*** | (2006.01) |
| ***E01H 1/05*** | (2006.01) |
| ***B05B 1/20*** | (2006.01) |
| ***B08B 3/04*** | (2006.01) |

(52) U.S. Cl.
CPC .................. *B08B 3/04* (2013.01); *B08B 7/04* (2013.01); *E01H 1/045* (2013.01); *E01H 1/047* (2013.01); *E01H 1/056* (2013.01)

(58) Field of Classification Search
CPC ............. A47L 11/4016; A47L 11/4025; A47L 11/408; A47L 11/4083; A47L 11/4088; E01H 1/04; E01H 1/047; E01H 1/045; E01H 1/02; E01H 1/05; E01H 1/053; E01H 1/056; E01H 1/10; E01H 1/101; E01H 1/106; E01H 3/02; E02F 3/188; E02F 3/962; E02F 3/963; E02F 3/964
USPC ........................................... 15/78, 82–83, 87
See application file for complete search history.

(56) References Cited

U.S. PATENT DOCUMENTS

| | | | | | |
|---|---|---|---|---|---|
| 2,505,199 | A * | 4/1950 | Mott | E01H 1/047 | 15/85 |
| 2,708,280 | A * | 5/1955 | Antos | E01H 1/045 | 15/83 |
| 2,709,269 | A * | 5/1955 | Williams | A47L 11/4061 | 37/232 |
| 2,917,761 | A * | 12/1959 | Burgdorff | E01H 1/047 | 15/84 |
| 3,178,746 | A * | 4/1965 | Voelstad | E01H 1/045 | 15/83 |
| 3,453,678 | A * | 7/1969 | Smith | A47L 11/34 | 15/82 |
| 4,214,338 | A * | 7/1980 | Kyle | E01H 1/04 | 15/83 |
| D297,779 | S | 9/1988 | Linde | | |
| D314,265 | S | 1/1991 | Hong | | |
| D346,468 | S | 4/1994 | Dusinberre et al. | | |
| D370,322 | S | 5/1996 | Canni Ferrari | | |
| 5,638,572 | A | 6/1997 | Canni Ferrari | | |
| D383,578 | S | 9/1997 | Ho | | |
| D412,401 | S | 8/1999 | Stutzer et al. | | |
| 6,016,584 | A | 1/2000 | Melroe | | |
| 6,041,471 | A | 3/2000 | Charky et al. | | |
| D424,263 | S | 5/2000 | Canni Ferrari et al. | | |
| 6,662,478 | B1 | 12/2003 | Virnig | | |
| 6,687,939 | B1 * | 2/2004 | Koester | E01H 1/045 | 15/83 |
| 6,997,667 | B2 | 2/2006 | Hackett et al. | | |
| 7,958,596 | B2 | 6/2011 | Torno | | |
| D647,267 | S | 10/2011 | Kaleta et al. | | |
| D648,910 | S | 11/2011 | Raven et al. | | |
| 9,474,198 | B1 | 10/2016 | Crummey | | |
| 10,137,815 | B2 * | 11/2018 | Zanini | E01H 1/056 | |
| 2006/0090284 | A1 | 5/2006 | Chen | | |
| 2019/0365166 | A1 * | 12/2019 | Chao | A47L 1/02 | |
| 2021/0245648 | A1 * | 8/2021 | Huang | B60P 1/16 | |

FOREIGN PATENT DOCUMENTS

| | | | | | |
|---|---|---|---|---|---|
| CN | 201958824 | U | | 9/2011 | |
| CN | 102440737 | A | | 5/2012 | |
| CN | 202262941 | U | | 6/2012 | |
| CN | 202313130 | U | | 7/2012 | |
| CN | 202313152 | U | | 7/2012 | |
| CN | 202505278 | U | | 10/2012 | |
| CN | 203256654 | U | | 10/2013 | |
| CN | 204671071 | U | | 9/2015 | |
| CN | 108517819 | A | * | 9/2018 | |
| CN | 111820829 | A | | 10/2020 | |
| CN | 211637426 | U | | 10/2020 | |
| EP | 1013212 | A2 | | 6/2000 | |
| EP | 1245735 | A1 | * | 10/2002 | B66F 9/18 |
| EP | 2463441 | B1 | | 1/2019 | |
| EP | 2463441 | B1 | * | 1/2019 | E01H 1/05 |
| FR | 2726589 | A1 | * | 5/1996 | B66F 9/08 |
| KR | 20000058494 | | | 10/2000 | |
| KR | 10-0768343 | B1 | | 10/2007 | |
| KR | 100911192 | B1 | * | 8/2009 | |
| WO | WO 1996/022724 | A1 | | 8/1996 | |

OTHER PUBLICATIONS

Patent Simex Catalog, "Self-Levelling Planers," Simex PL, 2016, 8 pages.

Application and File history for U.S. Appl. No. 29/804,179, filed Aug. 18, 2021. Inventors: Virnig et al.

Industrial floor sweeper, posted Mar. 5, 2021 [online], [retrieved Apr. 14, 2023]. Retrieved from internet, https://www.amazon.com/Industrial-Sweeper-Triple-Outdoor-Contai ner/dp/B08Y624KWX/ref=sr _ 1_2_sspa?crid=2WH R 1 SB LZNTD3&keywords=automatic+broom&qid=1681482834&sprefix=automatic+broom%2Caps%2C117&sr=8-2-spons&p (Year: 2021).

Carpet sweeper, posted Sep. 24, 2019 [online], [retrieved Apr. 14, 2023]. Retrieved from internet, https://www.amazon.com/Eyliden-Sweeper-Automatic-Compact-Brushes/dp/B07XDWNT17/ref=sr _ 1_55?crid=2WH R 1 SBLZNTD3&keywords=automatic% 2 Bbroom &qid=1681483 730&sprefix=automatic%2 Bbroom%2Caps %2C 117 &sr=8-55&th =1 (Year: 2019).

* cited by examiner

PICK-UP BROOM ATTACHMENT WITH INTERNAL WATER TANK

RELATED APPLICATION

This application claims the benefit of U.S. Provisional Application No. 63/144,587 filed Feb. 2, 2021, which is hereby fully incorporated herein by reference.

TECHNICAL FIELD

This disclosure relates to broom implements for work vehicles, and more particularly to pick-up broom attachments for work vehicles having an internal compartment that supplies water for dust control and related actions for improved sweeping of dirt from worksites and outdoor environments.

BACKGROUND

Clean-up of dust and debris from roads and worksites can be a difficult and laborious task, but can be important for providing clean orderly appearances in certain outdoor locations. Various vehicles and attachable tools have been made to accomplish such outdoor cleaning. One effective attachment/implement tool that has been used to accomplish outdoor clean-up efficiently is referred to as a pick-up broom. This type of implement includes a housing at least partially surrounding a large rotating brush that is driven by a motor. Some pick up brooms further include a bucket into which material is swept. Other terms for similar products include: sweepers; collector brooms; utility brooms; and hopper brooms. These pick-up brooms and similar products have been designed to be used with skid steer loaders, compact track loaders, tele-handlers, wheel loaders, tractors, compact utility loaders, and similar equipment.

Pick-up brooms have often been used for clean-up tasks in environments with conditions that can complicate such clean-up. For example, many sites involve areas where significant quantities of dust can be generated by the rotary sweeping movement of the pick-up broom. Examples of tasks at such sites include road building and resurfacing, cleaning parking lots, construction site cleanup, and cleaning of streets and neighboring paved areas associated with landscaping jobs. In many cases, while pick-up brooms are generally effective, dust has been a significant problem. Dust can introduce an airborne mess and can reduce visibility of a vehicle operator and the surrounding area which can be dangerous. In some situations and environments, there must be compliance with government regulations related to airborne dust.

Some pick-up brooms have been designed to apply water beneath the housing of the broom or ahead of the broom's path during use to reduce dust. The dampness provided reduces the dust introduced into the air. This has been done by spraying water from water tanks strapped to vehicles themselves or water tanks secured to the top or the sides of the pick-up broom. While use of water is an effective feature, the tanks of water strapped or otherwise joined to the outer parts of the implements are somewhat problematic. For example, existing tanks tend to carry less water than desired, create issues with weight distribution of the implement, cause instability, reduce visibility of the vehicle operator, etc. Moreover, water tanks mounted to vehicles themselves, such as the roof of a skid steer loader, are cumbersome and are not easy to move from one loader to another.

Accordingly, there is a desire for an improved apparatus and/or related methods for pick-up broom attachments with improved dust control and that is more effective than past devices and overcomes past difficulties.

SUMMARY

Embodiments described or otherwise contemplated herein substantially provide the advantages of improved pick-up broom attachments that enable enhanced clean-up capabilities including dust abatement, control, and versatility.

One embodiment relates to a pick-up broom attachment for use with a work vehicle that includes a hood assembly, a bucket portion, and a water spray bar. The hood assembly includes a housing having a front end, a pair of side members, and a top cover. The housing further defines an opening to an interior of the housing. The hood assembly also includes a rotatable brush of generally cylindrical profile mounted for rotation between the side members of the housing, primarily within the interior of the housing. The hood assembly additionally includes a drive motor coupled to the housing for rotating the rotatable brush. The bucket portion is in coupled engagement behind and with the hood assembly and includes a collection bin, an internal water tank, and a back panel. The collection bin is defined by a bottom bucket panel, a pair of side bucket panel members, and a rear bucket wall. The internal water tank is located in a cavity in the bucket portion located rearward of the rear bucket wall. The back panel is located rearward of the internal water tank and includes implement interface members for connecting with a work vehicle. The water spray bar is mounted to the front end of the housing of the hood assembly. The water spray bar connects to the internal water tank for delivering water in front of or below the hood assembly.

One embodiment relates to a pick-up broom attachment for use with a work vehicle including a hood assembly and a bucket portion. The hood assembly includes a housing cover defining a closed front, top and sides and an open bottom. The hood assembly also includes a rotatable brush mounted for rotation beneath the housing cover. The hood assembly also includes a drive motor coupled to the rotatable brush for providing a sweeping rotation. The bucket portion is in coupled engagement with the hood assembly and includes a collection bin, an internal water tank, and a back panel. The collection bin provides the front of the bucket portion including an angled rear bucket wall. The internal water tank is located in a cavity in the bucket portion located rearward of the angled rear bucket wall. The back panel is located rearward of the internal water tank and includes implement interface members for connecting with a work vehicle.

The above summary is not intended to describe each illustrated embodiment or every implementation of the subject matter hereof. The figures and the detailed description that follow more particularly exemplify various embodiments.

BRIEF DESCRIPTION OF THE FIGURES

Subject matter hereof may be more completely understood in consideration of the following detailed description of various embodiments in connection with the accompanying figures, in which.

Figure 1:
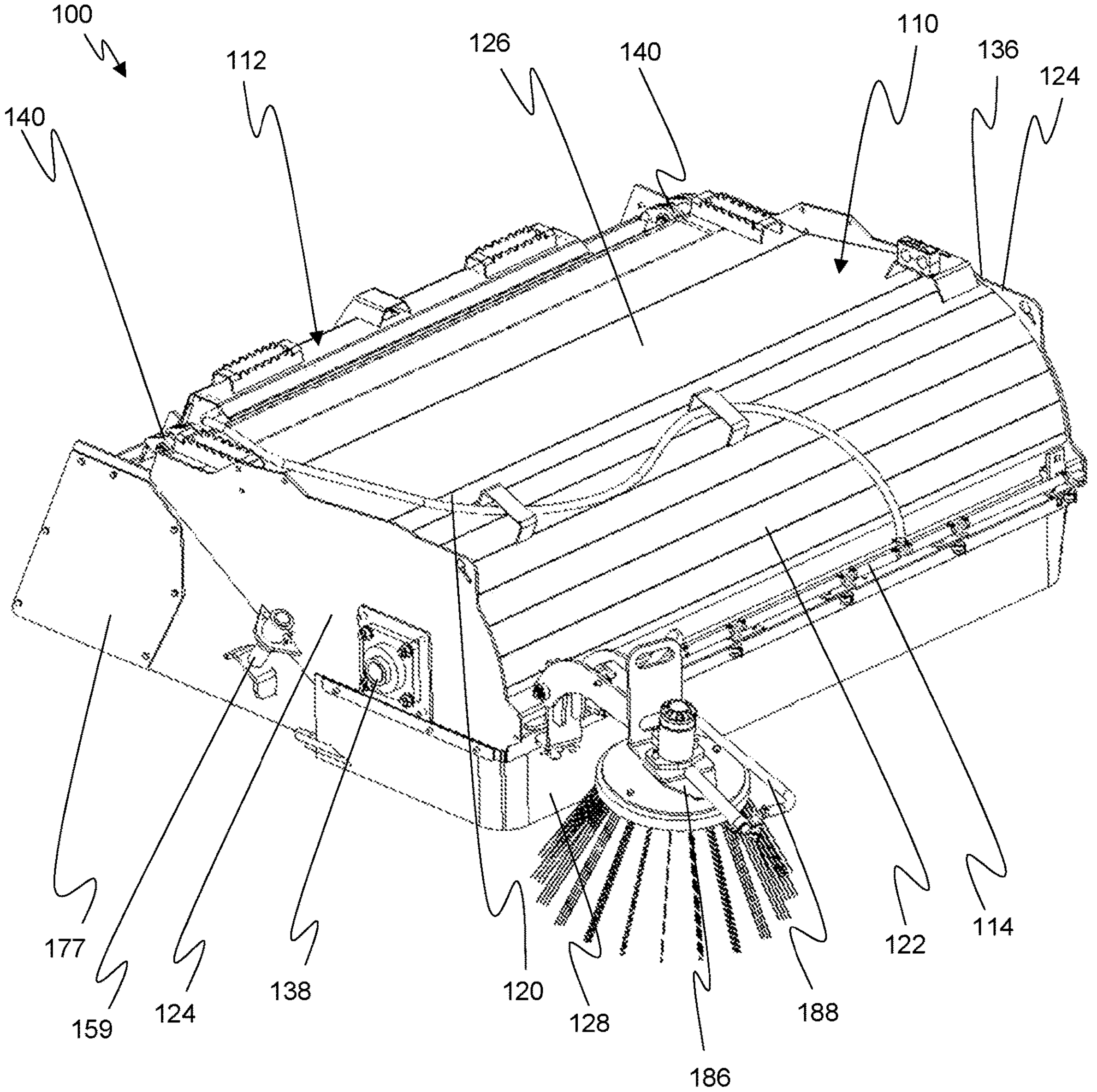
FIG. 1 is a top perspective view of a pick-up broom attachment, according to an embodiment.

While various embodiments are amenable to various modifications and alternative forms, specifics thereof have been shown by way of example in the drawings and will be described in detail. It should be understood, however, that the intention is not to limit the claimed subject matter to particular embodiments described. On the contrary, the intention is to cover all modifications, equivalents, and alternatives falling within the spirit and scope of the subject matter as defined by the claims.

DETAILED DESCRIPTION OF THE DRAWINGS

Embodiments generally relate to pick-up brooms and related components and assemblies. Throughout this disclosure, the term “pick-up broom attachment”, “pick-up broom implement” or “pick-up broom” may be used interchangeably to generally refer to any of a variety of different types of sweepers, collector brooms, utility brooms, and hopper brooms, and use of these terms should be understood and interpreted to broadly encompass these types of apparatus.

In general, the pick-up broom attachment 100 described in this disclosure is designed for use with a work vehicle such as a skid steer loader. Embodiments disclosed herein will largely reference work vehicles of this type. However other vehicles such as compact track loaders, tele-handlers, wheel loaders, tractors, compact utility loaders, and similar equipment should be equally interpreted to be “work vehicles” for purposes of this disclosure and claims such that various work vehicles can be used with a pick-up broom attachment 100. A skid steer loader is one type of tremendously versatile work vehicle both in terms of its maneuverability and seemingly endless variety of attachments that can be coupled to its pair of loader arms that can be raised, lowered, and manipulated by the work vehicle operator.

FIGS. 1-6 each show a pick-up broom attachment 100 or parts thereof in various configurations or portions. Certain portions of a pick-up broom attachment 100 are not present in certain figures. Referring first to the top and bottom perspective views of FIGS. 1 and 2, the pick-up broom attachment 100 includes a hood assembly 110, a bucket portion 112, and a water spray bar 114.

The hood assembly 110 includes a housing 120 having a front end 122, a pair of side members 124, and a top cover 126. The front end 122, side member 124 and top cover 126 collectively provide a housing cover that provides a closed outer shell. The various features making up the housing cover each have a multi-faceted and multi-shaped profile. In various embodiments, these components can be generally made of high strength steel material. The front end 122 and top cover 126 can be seen as converging together in a curved fashion. The side members 124 are largely planar. The lower part of the front end 122 and forward part of the side member 124 is made up of a durable, flexible material 128 that is in contact with the surface to help contain flying dust, dirt, and debris. The housing 120 further defines an opening 130 in its bottom surface to an interior 132 of the housing 120.

Figure 2:
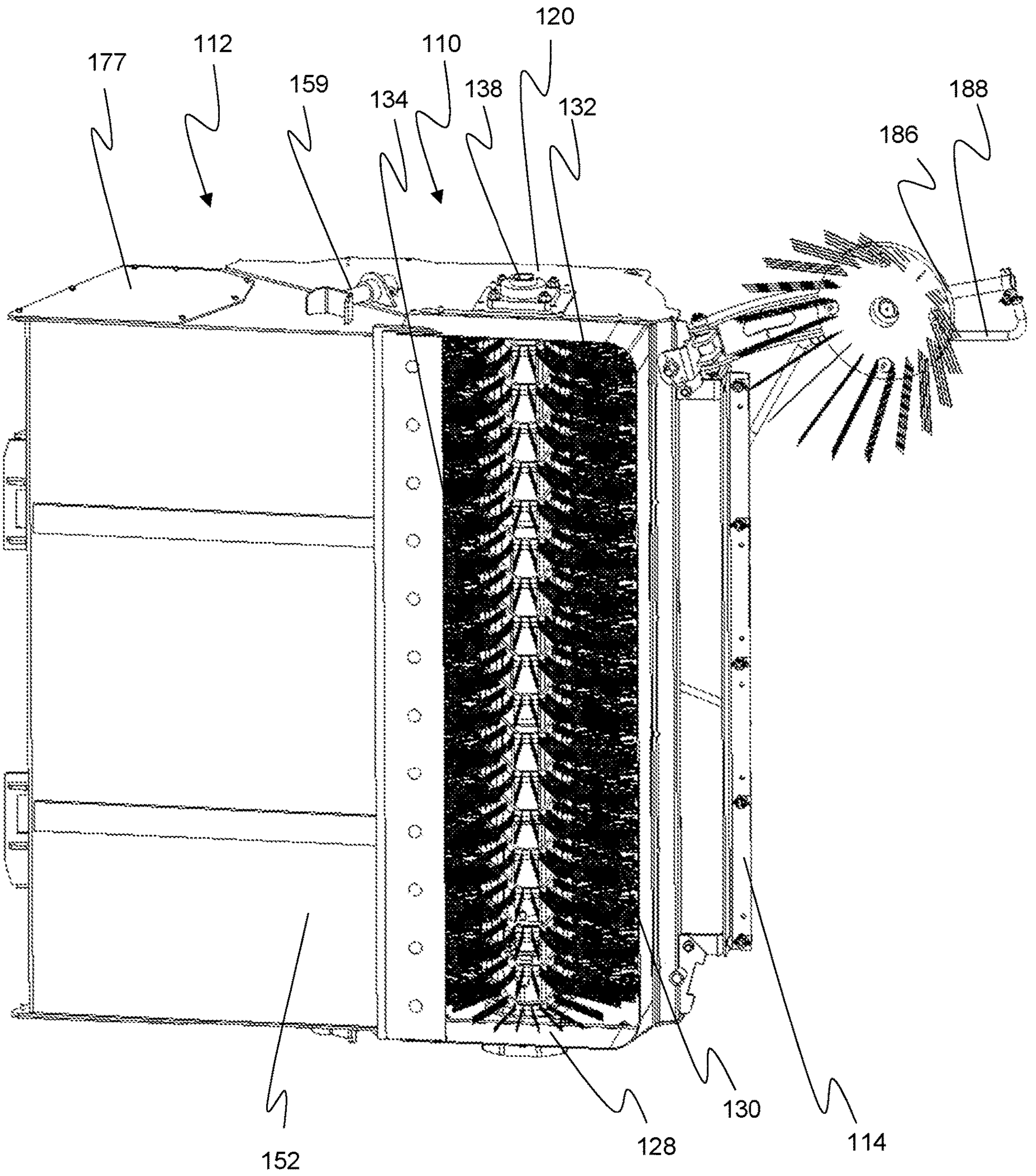
FIG. 2 is a bottom perspective view of a pick-up broom attachment, according to an embodiment.

The hood assembly 110 further includes a centrally-mounted rotatable brush 134 of a generally cylindrical profile that is mounted for rotation between the side members 124 of the housing 120. A cylindrical rotatable brush 134 is depicted in FIG. 2. An actual rotatable brush 134 would typically have a large number of wafers disposed across the width of the opening 130 in various embodiments. The rotatable brush 134 is primarily located within the interior 130 of the housing 120, beneath the housing cover. However, the bristles of the rotatable brush 134 can partially protrude and extend beyond the confines of the housing 120, such that they make contact with the surface over which the pick-up broom attachment 100 passes.

The hood assembly 110 also includes a drive motor 136 coupled to the housing 120 for rotating the rotatable brush 134. The drive motor 136 can be a direct drive motor, for example, that is well-guarded by one of the side members 124 of the housing 120 and/or protective plates surrounding the drive motor 136. The opposite side member 124 includes a greasable bearing 138 to accommodate the sweeping rotation of rotatable brush 134. Accordingly, drive motor 122 is able to rotate the rotatable brush 134 such that dirt and debris located on the surface beneath the brush 134 are swept up and forced into the bucket portion 112 by its motion.

Bucket portion 112 is coupled to the hood assembly 110, where the bucket portion 112 is located behind the hood assembly 110. Specifically, the bucket portion 112 and the hood assembly 110 are coupled via pivotal coupling members 140 that allow pivotal motion between the two components. This pivotal arrangement allows the components to pivot apart from one another at their base for emptying the bucket portion 112 when full of debris.

Figure 3:
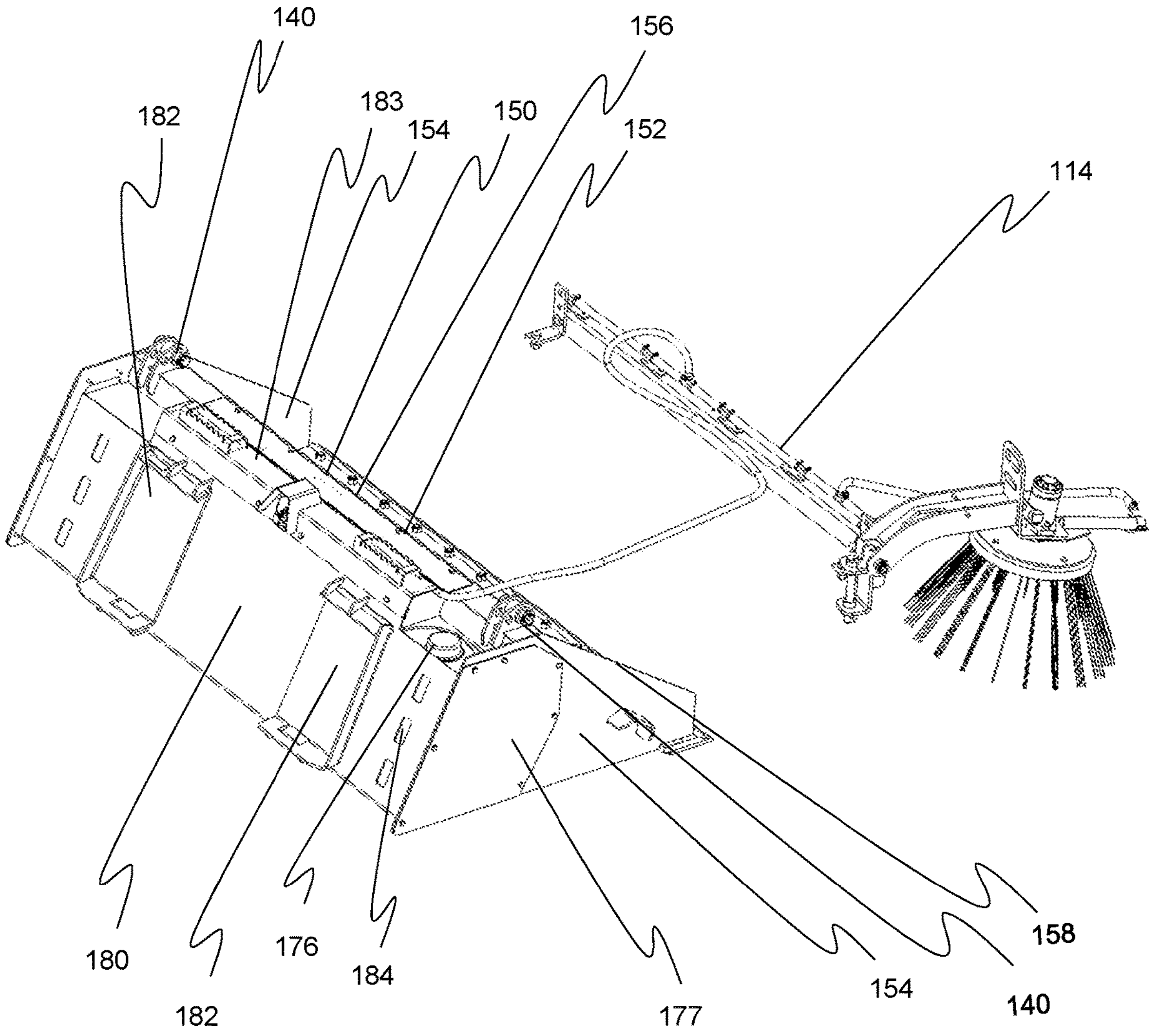
FIG. 3 is a perspective exploded view of a pick-up broom attachment with the hood assembly removed, according to an embodiment.

Bucket portion 112 can be understood from FIG. 3 in which the hood assembly 110 has been removed from the pick-up broom attachment 100 for clarity. The bucket portion 112 includes a first part on the forward side of the component that is referred to as a collection bin 150 for purposes of this disclosure. The collection bin 150 is understood as the combination of the interior walls and surfaces of a bucket implement. The collection bin 150 is defined by a combination of the upper surface of a generally flat bottom bucket panel 152, the interior surfaces of a pair of vertically oriented side bucket panel members 154, and the interior surface of a rear bucket wall 156 which is angled. Specifically the rear bucket wall 156 angles inward from bottom back to top forward position such that the base of the collection bin 150 interior is wider than its upper portion. The perimeter edge 158 of the collection bin 150 is shaped for coupled alignment and engagement with the hood assembly 110. Based on this positioning, swept up dirt and debris are deposited in the collection bin 150 of the bucket portion 112 when the pick-up broom 100 is in use. Pin adjustment members 159 can also be seen on the exterior surface of the side bucket panel members 154. See FIGS. 1 and 2. These pin adjustment members 159 use pins with multiple holes that allow an operator to set bristle height for the pick-up broom attachment.

Bucket portion 112 further includes an internal water tank 160 located in a cavity 162 in the bucket portion 112 that is located rearward of the angled rear bucket wall 156. Specifically, behind the angled rear bucket wall 156, an elongate cavity 162 is present that extends from one side of the bucket portion 112 to the other side of the bucket portion 112. Accordingly, an internal water tank 160 is located within the elongate cavity 162 of the bucket portion 112.

Figure 5:
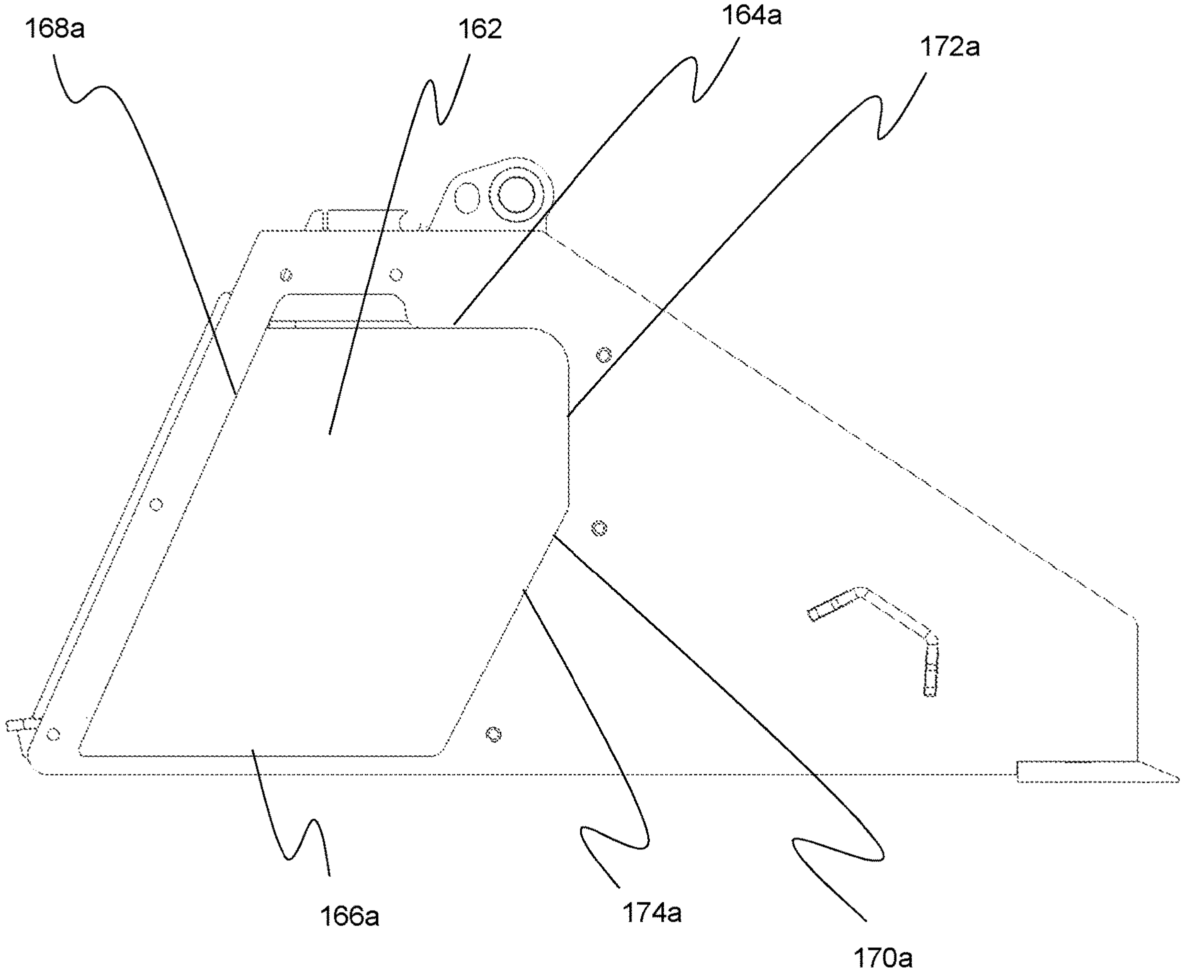
FIG. 5 is a side view of the bucket portion of a pick-up broom attachment with the top protective cover, the structural side plates, and internal water tank removed, according to an embodiment.

FIG. 5 depicts a side view that shows the profile of the cavity 162 in which the internal water tank 160 is normally located. As shown, the interior surfaces of the cavity 162 include a top interior surface 164*a* and a bottom interior surface 166*a* that are generally horizontal in orientation and parallel to one another but vertically offset from one another. The top interior surface 164*a* should be understood to include a cross-member spanning the width of the pick-up broom attachment 100 which helps supply structural support. Accordingly, in various embodiments, the height of the interior water tank 160 located within a cavity 162 is limited to the height of the top interior surface 164*a* and its cross member. In some embodiments, the bottom interior surface 166*a* can be viewed as aligned with and a continuation of the bottom bucket panel 152. In such embodiments, an interior water tank 160 can be understood to touch and be resting on the bottom bucket panel of the bucket portion 112, such that the load imposed by the interior water tank 160 and its contents is essentially presented at the very bottom of the bucket portion 112 of the pick-up broom attachment 100. Such a location provides advantages in terms of weight distribution and stability to the pick-up broom attachment 100.

Further, back interior side surface 168*a* is disposed at an angle of less than ninety degrees from the bottom interior surface 166*a*. Front interior surface 170*a* is made up of a first vertically oriented interior section 172*a* and a second angled interior section 174*a*. The first vertically oriented interior section 172*a* extends downwardly from top interior surface 164*a* in a generally perpendicular direction. The second angled interior section 174*a* angles rearwardly from the first vertically oriented interior section 172*a*. In some embodiments, the second angled interior section 174*a* parallels the angle of the rear bucket wall 156, and which forms an angle of more than ninety degrees with respect to the bottom interior surface 166*a*.

Internal water tank 160 can have a variety of shapes and sizes. In the particular embodiment shown in FIG. 6, internal water tank 160 is a multi-sided container with a plurality of angled outer surfaces. Because of the internal nature of the internal water tank 160, the tank does not interfere with the view of an operator and allows for a more compact, uniform attachment.

Figure 6:
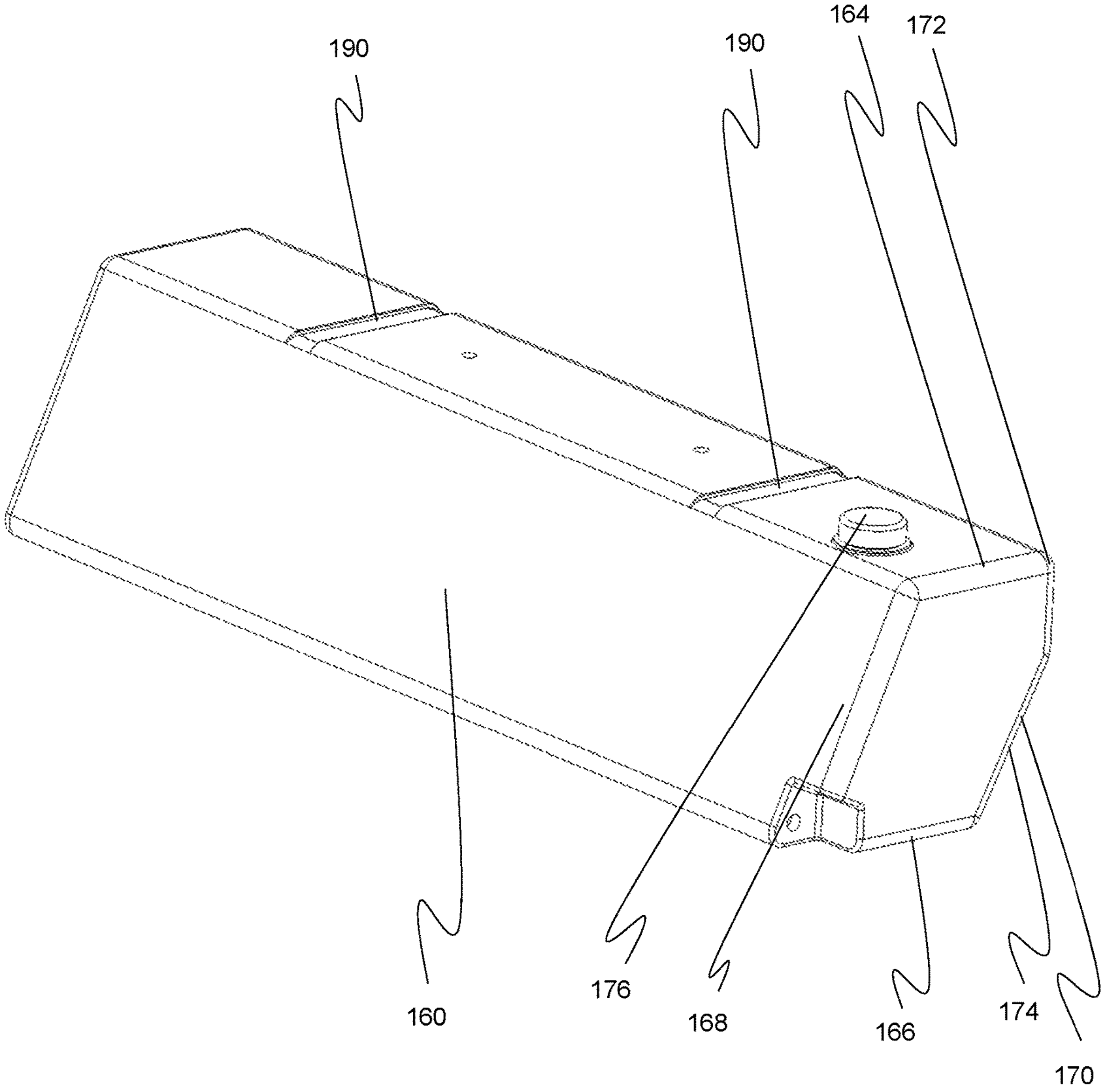
FIG. 6 is a perspective view of the interior water tank of a pick-up broom attachment, according to an embodiment.

FIG. 6 depicts a perspective view that shows the side profile of the internal water tank 160. As shown, top surface 164 and bottom surface 166 are generally horizontal in orientation and parallel to one another but vertically offset from one another.

Further, back side surface 168 is disposed at an angle of less than ninety degrees from the bottom surface 166. In some embodiments, buckets for brooms may instead provide a ninety degrees or greater angle for this feature, as needed for specific types of work vehicles. Front surface 170 is made up of a first vertically oriented section 172 and a second angled section 174. The first vertically oriented section 172 extends downwardly from top surface 164 in a generally perpendicular direction. The second angled section 174 angles rearwardly from the first vertically oriented section 172. In some embodiments, the second angled section 174 parallels the angle of the rear bucket wall 156, and which forms an angle of more than ninety degrees with respect to the bottom surface 166.

Also seen on the exterior of the internal water tank 160 in FIG. 6 are a pair of grooves 190. These grooves 190 can be used with steel bands to secure the internal water tank 160 inside the pick-up broom attachment 100.

In some embodiments, water tank 160 is adapted to provide a large volume for holding water without eliminating needed space at the lower part of the collection bin 150 of the bucket portion 112 for dirt and debris collection. Specifically, the internal water tank 160 can be shaped to include an angled front surface 170 to minimize interference with the collection bin 150. In some embodiments, the internal water tank 160 will be sized to hold up to 55 gallons of water. In some embodiments, the internal water tank 160 will be sized to hold between 50 and 60 gallons of water. In some embodiments, the internal water tank 160 will be sized to hold between 60 and 200 gallons of water. In some embodiments, as shown in FIGS. 1-6 here, the internal water tank 160 can be understood to span then entire internal width of the pick-up broom attachment 100. In some embodiments, the internal water tank 160 includes multiple compartments, partitions or barriers. In some embodiments, such internal water tank structure are included to limit water movement somewhat to prevent drastic shifts in weight from one side of the attachment to the other when tipped. In some skid loader embodiments tanks of 50 to 100 gallon could be used. In some work vehicles of other types, it is possible that up to 250 gallon tanks could be used for certain embodiments.

Figure 4:
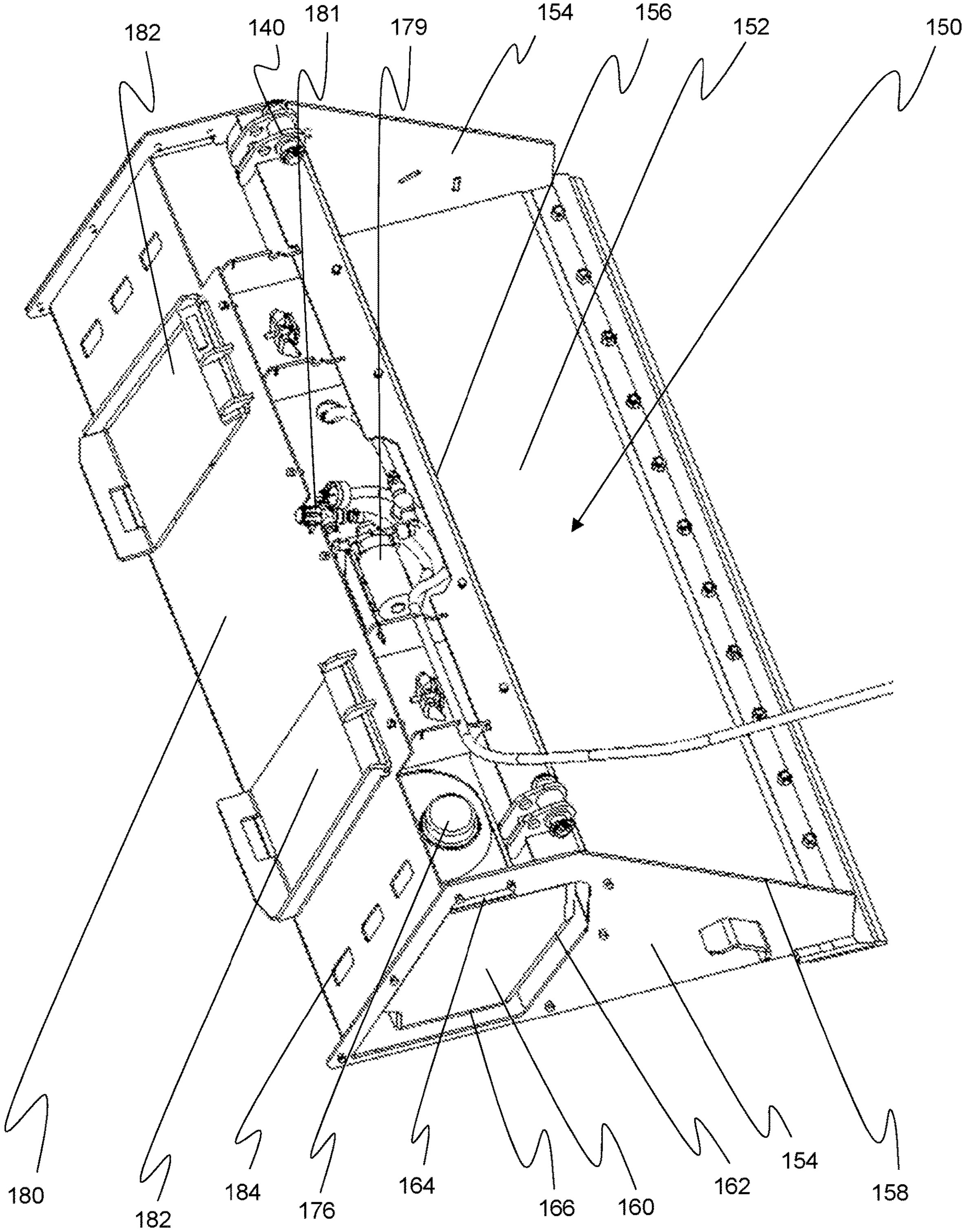
FIG. 4 is a perspective view of the bucket portion of a pick-up broom attachment with the top protective cover and the structural side plates removed, according to an embodiment.

Although removed for visibility in FIGS. 4 and 5, the bucket portion 112 further includes structural side plates 177 that are bolted to the bucket portion 112 on each bucket side panel 154 adjacent the sides of the internal water tank 160. Not only do these structural side plates 177 conceal and provide protection to the internal water tank 160 from the sides, but these high strength plates 177 also help provide structural strength and rigidity to the entire pick-up broom attachment 100.

An aperture 176 provides an opening to the internal water tank 160 that is present in the top of the tank 160 at the end of a fill neck and can be covered by a removable cap (not shown). Accordingly, the aperture can provide an opening to the internal water tank 160 that can be accessed for filing from above the bucket portion 112. In some embodiments, the internal water tank 160 is made of a plastic material. In some embodiments the internal water tank 160 can be made of aluminum, stainless steel, or other material that can contain water. Also located on the bucket portion 112, above the internal water tank 160, are a water pump 179 and a pressure regulator 181 for supplying water to the water spray bar 114. The water pump 179 and pressure regulator 181 can be seen in the view provided in FIG. 4. However, these components can be generally located beneath a top protective cover 183 as shown in FIGS. 1 and 3. In various embodiments, a water pump 179 and pressure regulator 181 can be placed in alternate locations of the pick-up broom attachment 100.

Bucket portion 112 further includes a back panel 180 that is located rearward of the internal water tank 160. Back panel 180 includes implement interface members 182 for connecting with a work vehicle. In various embodiments, the angle of back panel 180 and the connection type offered by the implement interface members 182 are generally accepted interface configurations for attachment by the loader arms of a work vehicle. A wide variety of acceptable variations of vehicle coupling interface options are known and contemplated.

The back panel 180 of the bucket portion 112 is located at the end of the bucket portion 112 opposite the collection bin 150 and its opening. Back panel 180 provides the interface for coupling with the loader arms of a work vehicle. In general, the back panel 180 is angled at a similar orientation to the back side surface 168 of the internal water tank 160. The back panel 180 includes attachment receiving features, referred to implement interface members 182, for readily attaching to the work vehicle. Implement interface members 182 could vary in size and type in some embodiments depending upon the type of work vehicle intended for use with the pick-up broom attachment 100. Also located along the back panel 180 are a plurality of vertically-disposed, oval-shaped, fill line windows 184 through which the level of water in the internal water tank 160 can be visibly observed by an operator. Other types, shapes, and sizes of fill line windows 184 and/or related indicators of water level are possible in other embodiments as well.

In various embodiments, the internal water tank 160 is directly adjacent the implement interface members 182 on the back panel 180, such that weight from the internal water tank has a center of gravity located in close proximity to the implement interface members 182. In some embodiments, the interior water tank 160 has a height that does not exceed the height of the implement interface members. Some embodiments may include an internal water tank 160 taller than the implement interface members 182 but still be of low profile for visibility. In some embodiments, the internal water tank 160 is located below a cross-member spanning the width of the pick-up broom attachment 100. In the various embodiments contemplated, the potentially heavy internal water tank 160 is located near the implement interfaces 182, stability of the work vehicle is improved and a safer work vehicle and attachment is made possible.

Water spray bar 114 is also present in various embodiments of the pick-up attachment 100. In some embodiments, water spray bar 114 is mounted to the front end 122 of the housing 120 of the hood assembly 110. The water spray bar 114 connects to the internal water tank 160 for delivering water in front of or below the hood assembly 110. Various hoses and or flexible fluid connections can be utilized to facilitate this (one hose example is partially shown in FIG. 1). The water spray bar 114 can provide water via any number of a plurality of openings. Some embodiments can further include a bracket 186 and hose 188 mounted adjacent the water spray bar 114 as well. The bracket 186 and hose 188 can be used to spray water in front of a gutter brush, if one is mounted on the front end 122 of the housing 120. Such gutter brushes are common to pick-up broom attachments 100 and are used to sweep dirt along curbs and buildings, for example. The disclosed pick-up broom attachment 100 design and its innovative internal water tank placement and incorporation into this attachment provides improved visibility, stability, and an overall more compact safe piece of equipment.

Overall the pick-up broom attachment 100 is amenable to numerous shapes, sizes, and modifications. In some embodiments, the pick-up broom attachment 100 is adapted to be a 60 inch width attachment. In other embodiments the pick-up broom attachment is adapted to be a 72 inch width attachment or, alternatively, a 84 inch width attachment. Other greater or lesser width attachments are contemplated as well.

Various embodiments of systems, devices, and methods have been described herein. These embodiments are given only by way of example and are not intended to limit the scope of the claimed subject matter. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed subject matter.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

What is claimed is:

1. A pick-up broom attachment for use with a work vehicle, comprising:
- a hood assembly including:
  - a housing having a front end, a pair of side members, and a top cover, the housing further defining an opening to an interior of the housing;
  - a rotatable brush of generally cylindrical profile mounted for rotation between the side members of the housing, primarily within the interior of the housing;
  - a drive motor coupled to the housing for rotating the rotatable brush; and
- a bucket portion in coupled engagement behind and with the hood assembly, including:
  - a collection bin defined by a bottom bucket panel, a pair of side bucket panel members, and a rear bucket wall;
  - an internal water tank enclosed within a cavity having a top interior surface and a bottom interior surface, said internal water tank adjacent the bottom bucket panel in the bucket portion located rearward of the rear bucket wall; and
  - a back panel located rearward of the internal water tank that includes implement interface members for connecting with a work vehicle; and a water spray bar mounted to the front end of the housing of the hood assembly that connects to the internal water tank for delivering water in front of or below the hood assembly.

2. The pick-up broom attachment of claim 1, wherein the internal water tank is directly adjacent the implement interface members on the back panel, such that weight from the internal water tank has a center of gravity located in close proximity to the implement interface members.

3. The pick-up broom attachment of claim 1, wherein structural side plates are bolted to side bucket panel members of the bucket portion.

4. The pick-up broom attachment of claim 1, wherein the internal water tank has a capacity between 50 and 60 gallons of water.

5. The pick-up broom attachment of claim 1, wherein an opening to the internal water tank can be accessed for filling from above of the bucket portion.

6. The pick-up broom attachment of claim 1, wherein the interior water tank spans an entire internal width of the bucket portion from a first bucket panel member to a second bucket panel member.

7. The pick-up broom attachment of claim 1, wherein the back panel includes fill line windows in which the level of water in the internal water tank can be visibly observed by an operator.

8. The pick-up broom attachment of claim 1, wherein the internal water tank is shaped to include an angled front surface to minimize interference with the collection bin.

9. The pick-up broom attachment of claim 1, wherein a water pump and a pressure regulator for supplying water to the water spray bar are located above the internal water tank beneath a top protective cover.

10. A pick-up broom attachment for use with a work vehicle, comprising:

a hood assembly including:

a housing cover defining a closed front, top and sides and an open bottom;

a rotatable brush mounted for rotation beneath the housing cover; and a drive motor coupled to the rotatable brush for providing a sweeping rotation; and a bucket portion in coupled engagement with the hood assembly, including:

a collection bin providing a front of the bucket portion including an angled rear bucket wall;

an internal water tank located in the bottom of a cavity having a top interior surface and a bottom interior surface located rearward of the angled rear bucket wall; and a back panel located rearward of the internal water tank that includes implement interface members for connecting to loader arms of a work vehicle.

11. The pick-up broom attachment of claim 10, wherein a water spray bar is mounted to the hood assembly that connects to the internal water tank for delivering water in front of or below the hood assembly.

12. The pick-up broom attachment of claim 10, wherein the internal water tank is positioned on a bottom bucket panel of the bucket portion, such that weight from the internal water tank has a center of gravity located in close proximity to the implement interface members and the ground.

13. The pick-up broom attachment of claim 10, wherein structural side plates are bolted to side bucket panel members of the bucket portion.

14. The pick-up broom attachment of claim 10, wherein the internal water tank has a capacity between 60 and 200 gallons of water.

15. The pick-up broom attachment of claim 10, wherein the internal water tank is made of plastic.

16. The pick-up broom attachment of claim 10, wherein a top surface and a bottom surface of the interior water tank has a height that does not exceed a height of the implement interface members along the back panel.

17. The pick-up broom attachment of claim 10, wherein the back panel includes fill line windows in which the level of water in the internal water tank can be visibly observed.

18. The pick-up broom attachment of claim 10, wherein the internal water tank is shaped to include an angled front surface consistent with the angle of the angled rear bucket wall.

19. The pick-up broom attachment of claim 10, wherein a water pump and a pressure regulator for supplying water to the water spray bar are located above the internal water tank beneath a top protective cover.

20. A pick-up broom attachment for use with a work vehicle, comprising:

a hood assembly including:

a housing having a front end, a pair of side members, and a top cover, the housing further defining an opening to an interior of the housing;

a rotatable brush of generally cylindrical profile mounted for rotation between the side members of the housing, primarily within the interior of the housing;

a drive motor coupled to the housing for rotating the rotatable brush; and a bucket portion in coupled engagement behind and with the hood assembly, including:

a collection bin defined by a bottom bucket panel, a pair of side bucket panel members, and a rear bucket wall;

an internal water tank located in a cavity in the bucket portion located rearward of the rear bucket wall; and a back panel located rearward of the internal water tank that includes implement interface members for connecting with a work vehicle;

a water spray bar mounted to the front end of the housing of the hood assembly that connects to the internal water tank for delivering water in front of or below the hood assembly; and a water pump and a pressure regulator for supplying water to the water spray bar located above the internal water tank and beneath a top protective cover.

* * * * *